US011725898B2

(12) United States Patent
Muceus et al.

(10) Patent No.: US 11,725,898 B2
(45) Date of Patent: *Aug. 15, 2023

(54) SUPPRESSOR FOR A FIREARM

(71) Applicant: Battle Born Supply Co., Paradise Valley, NV (US)

(72) Inventors: Ian Muceus, Paradise Valley, NV (US); Adam Stempeck, Paradise Valley, NV (US)

(73) Assignee: Battle Born Supply Co., Paradise Valley, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/664,090

(22) Filed: May 19, 2022

(65) Prior Publication Data
US 2022/0276015 A1 Sep. 1, 2022

Related U.S. Application Data

(63) Continuation of application No. 16/855,387, filed on Apr. 22, 2020, now Pat. No. 11,353,277.

(51) Int. Cl.
*F41A 21/30* (2006.01)
*F41A 21/32* (2006.01)
(Continued)

(52) U.S. Cl.
CPC .............. *F41A 21/30* (2013.01); *F41A 21/32* (2013.01); *B33Y 10/00* (2014.12); *B33Y 70/00* (2014.12); *B33Y 80/00* (2014.12)

(58) Field of Classification Search
CPC ...................................................... F41A 21/30
See application file for complete search history.

(56) References Cited

U.S. PATENT DOCUMENTS 1,003,531 A * 9/1911 Smoot et al. ............. F01N 1/12
89/14.4
1,127,250 A * 2/1915 Humm .................... F41A 21/30
89/14.4
(Continued)

FOREIGN PATENT DOCUMENTS

CA 2923024 A1 9/2016
EP 0166802 A1 1/1986
(Continued)

OTHER PUBLICATIONS

International Search Report and Written Opinion dated Jul. 1, 2021 for PCT Patent Application No. PCT/IB2021/052593.
(Continued)

*Primary Examiner* — Derrick R Morgan
(74) *Attorney, Agent, or Firm* — MLO, a professional corp.

(57) ABSTRACT

Suppressors for firearms are disclosed. In some embodiments, a suppression core comprises an annular cylinder surrounding a center bore, and a baffle structure surrounding the annular cylinder. The annular cylinder and the baffle structure are concentric. The baffle structure comprises a triply periodic minimal surfaces (TPMS) structure. At a transition between the annular cylinder and the baffle structure, a plurality of first openings in the annular cylinder form continuous paths with a plurality of second openings in the baffle structure. In some embodiments, a suppression core comprises an annular cylindrical shape having a center bore, the suppression core comprising a TPMS structure. The TPMS has walls within the TPMS structure. A wall thickness of the walls of the TPMS structure or a unit cell size of the TPMS structure varies within the suppression core.

19 Claims, 16 Drawing Sheets

(51) Int. Cl.
*B33Y 80/00* (2015.01)
*B33Y 70/00* (2020.01)
*B33Y 10/00* (2015.01)

(56) References Cited

U.S. PATENT DOCUMENTS

| | | | |
|---|---|---|---|
| 1,939,700 A * | 12/1933 | Hofstetter | F41A 21/34 89/14.3 |
| 2,043,731 A * | 6/1936 | Bourne | F01N 1/006 89/14.4 |
| 2,448,382 A * | 8/1948 | Mason | F41A 21/30 89/14.4 |
| 3,667,570 A | 6/1972 | WerBell, III | |
| 3,713,362 A * | 1/1973 | Charron | F41A 21/30 89/14.4 |
| 3,786,895 A * | 1/1974 | Perrine | F01N 13/0097 89/14.4 |
| 4,576,083 A * | 3/1986 | Seberger, Jr. | F01N 1/08 89/14.4 |
| 5,136,923 A * | 8/1992 | Walsh, Jr. | F41A 21/30 89/14.4 |
| 6,308,609 B1 * | 10/2001 | Davies | F41A 21/30 89/14.4 |
| 7,412,917 B2 | 8/2008 | Vais | |
| 7,600,606 B2 | 10/2009 | Brittingham | |
| 7,874,238 B2 | 1/2011 | Silvers | |
| 8,087,338 B1 | 1/2012 | Hines | |
| 8,196,701 B1 * | 6/2012 | Oliver | F41A 21/30 89/14.4 |
| 8,286,750 B1 | 10/2012 | Oliver | |
| 8,875,612 B1 | 11/2014 | Klett et al. | |
| 9,194,640 B2 | 11/2015 | Wirth et al. | |
| 9,482,484 B2 | 11/2016 | Barney | |
| 9,506,710 B2 | 11/2016 | Smith | |
| 9,593,899 B2 | 3/2017 | Coppinger et al. | |
| 9,702,651 B2 | 7/2017 | Petersen | |
| 9,746,267 B2 | 8/2017 | Smith | |
| 9,851,166 B2 | 12/2017 | Petersen | |
| 10,487,961 B2 | 11/2019 | Eilers et al. | |
| 10,488,137 B1 | 11/2019 | Dean | |
| 11,248,870 B1 * | 2/2022 | Nagy-Zambo | F41A 21/30 |
| 2003/0145718 A1 * | 8/2003 | Hausken | F41A 21/30 89/14.4 |
| 2015/0285575 A1 | 10/2015 | Sclafani | |
| 2015/0354422 A1 * | 12/2015 | Liskey | F41A 21/30 89/14.4 |
| 2017/0003094 A1 * | 1/2017 | Person | F41A 21/30 |
| 2017/0299316 A1 * | 10/2017 | Vossler | F41A 21/34 |
| 2017/0328666 A1 * | 11/2017 | Liskey | F41A 21/30 |
| 2018/0117872 A1 * | 5/2018 | Abu Al-Rub | B32B 9/041 |
| 2018/0209757 A1 * | 7/2018 | Hibbitts | F41A 21/30 |
| 2018/0224235 A1 * | 8/2018 | Couvillion | F41A 21/30 |
| 2018/0292160 A1 | 10/2018 | Petersen | |
| 2018/0347931 A1 * | 12/2018 | Schoppman | F41A 21/36 |
| 2018/0372438 A1 * | 12/2018 | Washburn, III | F41A 21/30 |
| 2019/0128632 A1 * | 5/2019 | Christandl | F41A 21/30 |
| 2019/0242667 A1 * | 8/2019 | Lo | F41A 21/30 |
| 2019/0274925 A1 * | 9/2019 | Vlahinos | B65D 25/108 |
| 2020/0025491 A1 * | 1/2020 | Petersen | F41A 21/30 |
| 2020/0025493 A1 * | 1/2020 | Campbell | F41A 21/30 |
| 2020/0033070 A1 * | 1/2020 | Vlahinos | F01N 5/02 |
| 2020/0248980 A1 * | 8/2020 | Bragais | F41A 21/32 |
| 2020/0263947 A1 * | 8/2020 | Calderwood | F41A 21/36 |
| 2020/0292268 A1 * | 9/2020 | Lo | F41A 21/30 |
| 2021/0190450 A1 * | 6/2021 | Buchel | F41A 21/30 |
| 2022/0003503 A1 * | 1/2022 | Iyer | B01D 69/12 |

FOREIGN PATENT DOCUMENTS

| | | |
|---|---|---|
| WO | 2011035111 A1 | 3/2011 |
| WO | 2017082439 A1 | 5/2017 |

OTHER PUBLICATIONS

Notice of Allowance and Fees dated Mar. 16, 2022 for U.S. Appl. No. 16/855,387.

Yang et al. Acoustic absorptions of multifunctional polymeric cellular structures based on triply periodic minimal surfaces fabricated by stereolithography. Virtual and Physical Prototyping, Mar. 19, 2020, vol. 15, No. 2, pp. 1-8 [online], [retrieved on Jun. 14, 2021], Retrieved from.

* cited by examiner

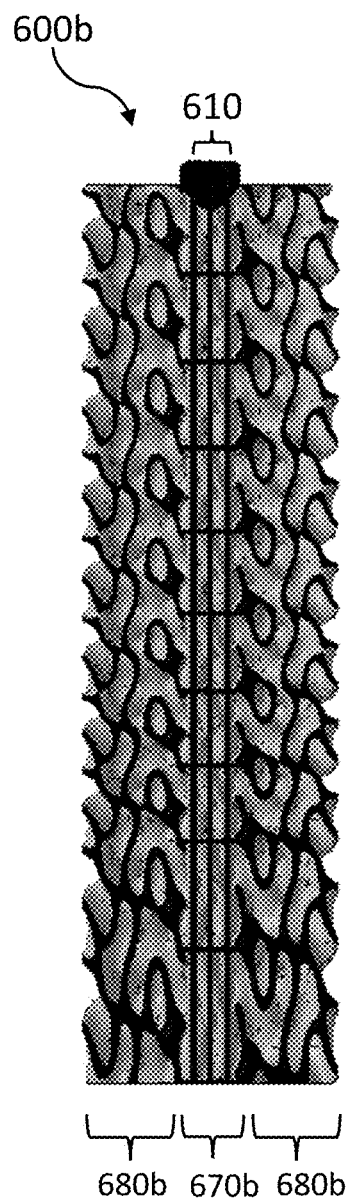
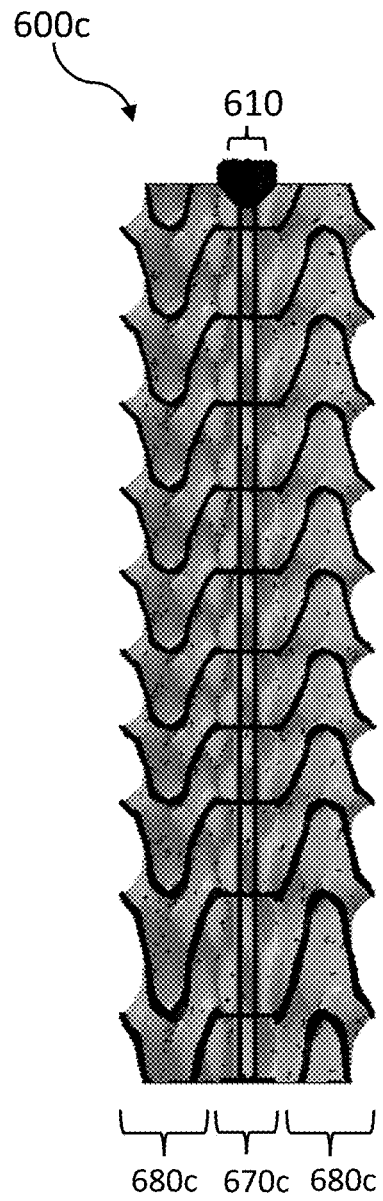
FIG. 6B
FIG. 6C

FIG. 7A    FIG. 7B

SUPPRESSOR FOR A FIREARM

RELATED APPLICATIONS

This application is a continuation of U.S. patent application Ser. No. 16/855,387, filed on Apr. 22, 2020, and entitled "Sound Suppressor"; which is hereby incorporated by reference in its entirety.

BACKGROUND

Sound suppressors are accessories for firearms that reduce the noise produced when the firearm is discharged. Suppressors decrease the sound signature, which can allow users to operate firearms without hearing protection. Sound suppressors, which are also known as silencers, attach to the muzzle of a firearm and are typically cylindrical in shape. Suppressors increase the volume available for propellant gases to disperse, above the volume that is provided by the cartridge and barrel of the firearm, and thereby decrease the pressure at which gases are then expelled out of the end of the suppressor as described by the general gas equation $P1*V1/T1=P2*V2/T2$, where P is pressure, V is volume and T is temperature. Baffles inside the silencer decrease the speed and pressure of propellant gases produced from firing a projectile by trapping gases in chambers formed by the baffles. Sound suppressors can also include an expansion chamber near the muzzle end, to provide a large chamber in which gases can expand and slow down before entering the baffles.

The baffles inside a sound suppressor surround a central bore through which a projectile ejected from the firearm travels. Example designs that have been used for baffles include flat disk dividers, angled dividers forming cone-shaped chambers (e.g., M, K, Z and Omega types), and helical channels. The baffles can be made in one monolithic piece for the entire suppressor or can be stacked together from individual baffle pieces.

SUMMARY

In some embodiments, a noise suppressor for a firearm includes a cylindrical body extending along a longitudinal direction, a chamber having an annular cylindrical shape, and a suppression core in the chamber. The chamber has i) an outer diameter defined by an inner surface of the body, ii) an inner diameter forming a center bore, and iii) a length along the longitudinal direction. The suppression core has a TPMS structure. A wall thickness or a unit cell size of the TPMS structure varies along the longitudinal direction in the chamber.

In some embodiments, a noise suppressor for a firearm includes a cylindrical body extending along a longitudinal direction, a chamber having an annular cylindrical shape, and a suppression core in the chamber. The chamber has i) an outer diameter defined by an inner surface of the body, ii) an inner diameter forming a center bore, and iii) a length along the longitudinal direction. The suppression core has a TPMS structure. A wall thickness of the TPMS structure varies in a radial direction in the chamber.

In some embodiments, a noise suppressor for a firearm includes a cylindrical body extending along a longitudinal direction, a chamber having an annular cylindrical shape, and a suppression core in the chamber. The chamber has i) an outer diameter defined by an inner surface of the body, ii) an inner diameter forming a center bore, and iii) a length along the longitudinal direction. The suppression core has an inner portion adjacent to the center bore and an outer portion surrounding the inner portion, the inner portion and the outer portion being concentric. The outer portion comprises a TPMS structure. At a transition between the inner portion and the outer portion, a plurality of first openings in the inner portion and a plurality of second openings in the outer portion have a parameter that matches in size with each other, and the plurality of first openings and the plurality of second openings are approximately aligned with each other.

In some embodiments, a suppression core comprises an annular cylinder surrounding a center bore, and a baffle structure surrounding the annular cylinder. The annular cylinder and the baffle structure are concentric. The baffle structure comprises a triply periodic minimal surfaces (TPMS) structure. At a transition between the annular cylinder and the baffle structure, a plurality of first openings in the annular cylinder form continuous paths with a plurality of second openings in the baffle structure.

In some embodiments, a suppression core comprises an annular cylindrical shape having a center bore, the suppression core comprising a TPMS structure. The TPMS has walls within the TPMS structure. A wall thickness of the walls of the TPMS structure or a unit cell size of the TPMS structure varies within the suppression core.

BRIEF DESCRIPTION OF THE DRAWINGS

FIGS. 6A-6C show vertical cutaway views of segmented suppressor cores having triply periodic minimal surfaces (TPMS) structures, in accordance with some embodiments.

FIGS. 7A-7C shows radial cutaway views of the suppressor cores of FIG. 6A, in accordance with some embodiments.

DETAILED DESCRIPTION

Noise suppression in firearms presents difficult challenges compared to other sound reduction situations. For example, firearms are subject to extremely high pressures and velocities of the propellant gases, must endure the heat from firing of a projectile, and have limited space in which to dissipate energy. Additionally, suppressors must withstand high impact forces created by firing of the projectiles.

Figure 1:
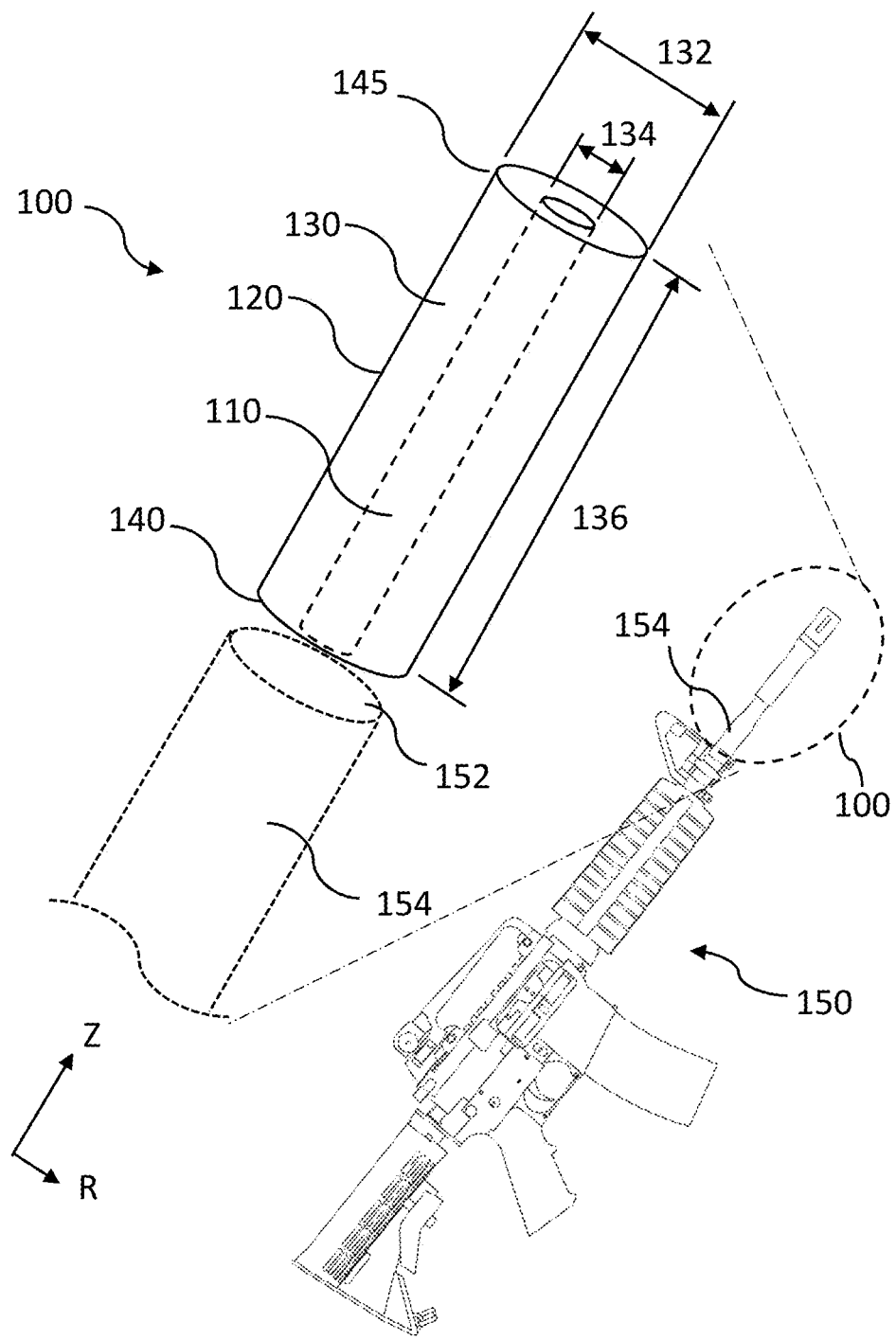
FIG. 1 is an isometric view schematic of a suppressor for a firearm, as known in the art.

FIG. 1 is a general schematic of a conventional suppressor 100 for a firearm 150. Suppressor 100 includes a center bore 110 through which a projectile travels, a main body 120 (which may also be referred to as a body, outer body or casing in this disclosure) surrounding the center bore 110, and an annular chamber 130 between the main body 120 and center bore 110. The body 120 is cylindrical in shape, extends in a longitudinal direction "Z" and also has a radial direction "R." Chamber 130, which is annular and cylindrically shaped, has an outer diameter 132 defined by an inner surface of the main body 120 (the thickness of the main body 120 is not shown in FIG. 1 for simplicity), an inner diameter 134 that forms the center bore 110, and a length 136. Entry end 140 of suppressor 100 will be attached to a muzzle 152 (firing end of the barrel 154) of the firearm 150. Exit end 145 of the suppressor 100, where the projectile leaves the suppressor 100, is opposite the entry end 140.

Figure 2:
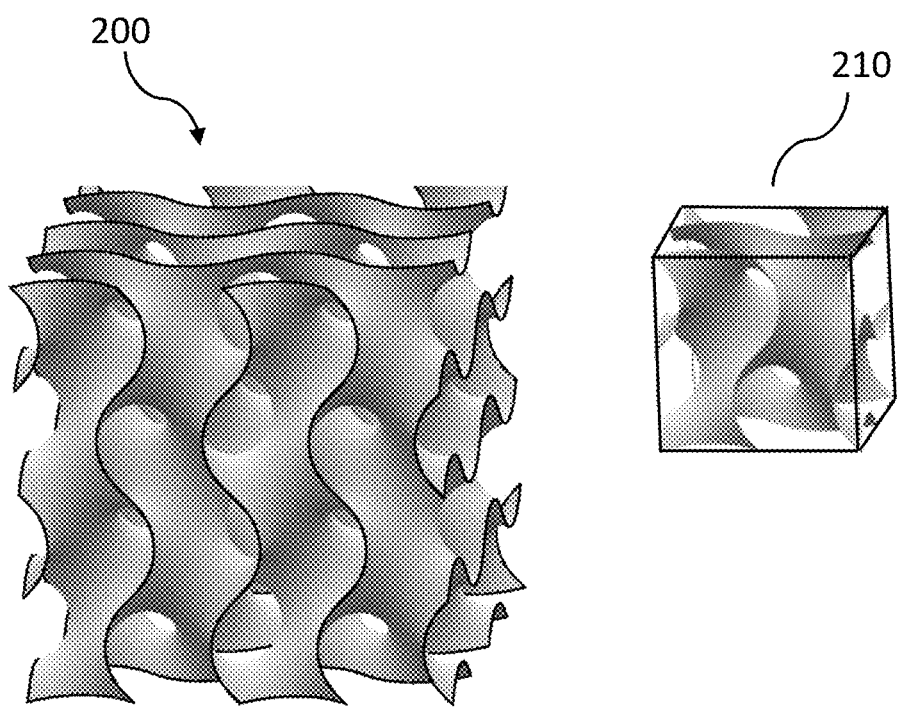
FIG. 2 is an isometric view of a gyroid triply periodic minimal surface, as known in the art.

Sound suppressors of the present disclosure utilize triply periodic minimal surfaces (TPMS) structures to provide improved noise reduction characteristics compared to conventional devices. A minimal surface is a geometry that locally minimizes the surface area for a given boundary. TPMS are periodic in three dimensions and are free of self-intersections. In this disclosure, the term TPMS shall be used to also mean infinite periodic minimal surfaces (IPMS). TPMS were first described by Hermann Schwarz in 1865, with additional TPMS described by Alan Schoen in 1970. TPMS/IPMS are described in terms of their fundamental region, which is the smallest portion of the surface used to construct the entire surface by periodically repeating the fundamental region in three dimensions. The fundamental region may also be referred to as a "unit cell" in this disclosure. These fundamental regions are bounded by mirror planes. One example of a TPMS is a gyroid surface 200 as shown in FIG. 2, along with the gyroid's unit cell 210 which is cubic. A gyroid can be approximated by:

$$\cos(x)\sin(y)+\cos(y)\sin(z)+\cos(z)\sin(x)=0$$

In another example, a Schwarz crossed layers of parallels (CLP) type of TPMS is described by the equations below, where $R(\tau)$ is the Weierstrass function and the Cartesian coordinates of the surface are the real parts (Re) of contour integrals, which are evaluated in the complex plane from a fixed point $\omega_0$ to a variable point $\omega$:

$$x = \text{Re} \int_{\omega_0}^{\omega} (1-\tau^2) R(\tau) d\tau$$

$$y = \text{Re} \int_{\omega_0}^{\omega} i(1+\tau^2) R(\tau) d\tau$$

$$z = \text{Re} \int_{\omega_0}^{\omega} 2\tau R(\tau) d\tau$$

Other types of TPMS include Schoen's, Batwing, Neovius, Starfish, hybrids, and variations of each of these (e.g., Schoen's types include gyroid, CLP, I-6, H'-T, T'-R', S'-S" and others). Any of these TPMS structures, including types not listed herein, may be utilized in the present disclosure.

The use of highly complex geometries such as TPMS structures in a suppressor is counterintuitive, as adding more surface area in the limited space available within a suppressor would typically be expected to add more material, thus increasing cost and weight. In this disclosure, embodiments involve designs that uniquely tailor the parameters of TPMS structures to be suitable for the demanding conditions produced by firearm projectiles—such as dissipating high levels of sound, heat and mechanical energy—while also having beneficial performance in other aspects such as manufacturability and providing a user-acceptable weight and cost of the device. The noise suppressors of the present embodiments utilize TPMS structures to fill some or all of the volume of the annular chamber of a suppressor. In some embodiments, the TPMS structures can be constructed using additive manufacturing techniques, which is also known as 3D printing.

The present suppressors with TPMS structures utilize the insight that the best possible noise suppression is achieved by having propellant gases travel the furthest distance possible in a given volume while transferring their kinetic energy into friction and heat energy in the suppressor core and casing body. As the gases finally leave the end of the suppressor, the TPMS structures of the present disclosure effectively reduce the exit pressures, cool and slow the gases, and enable greatly improved passive noise suppression.

Figure 3:
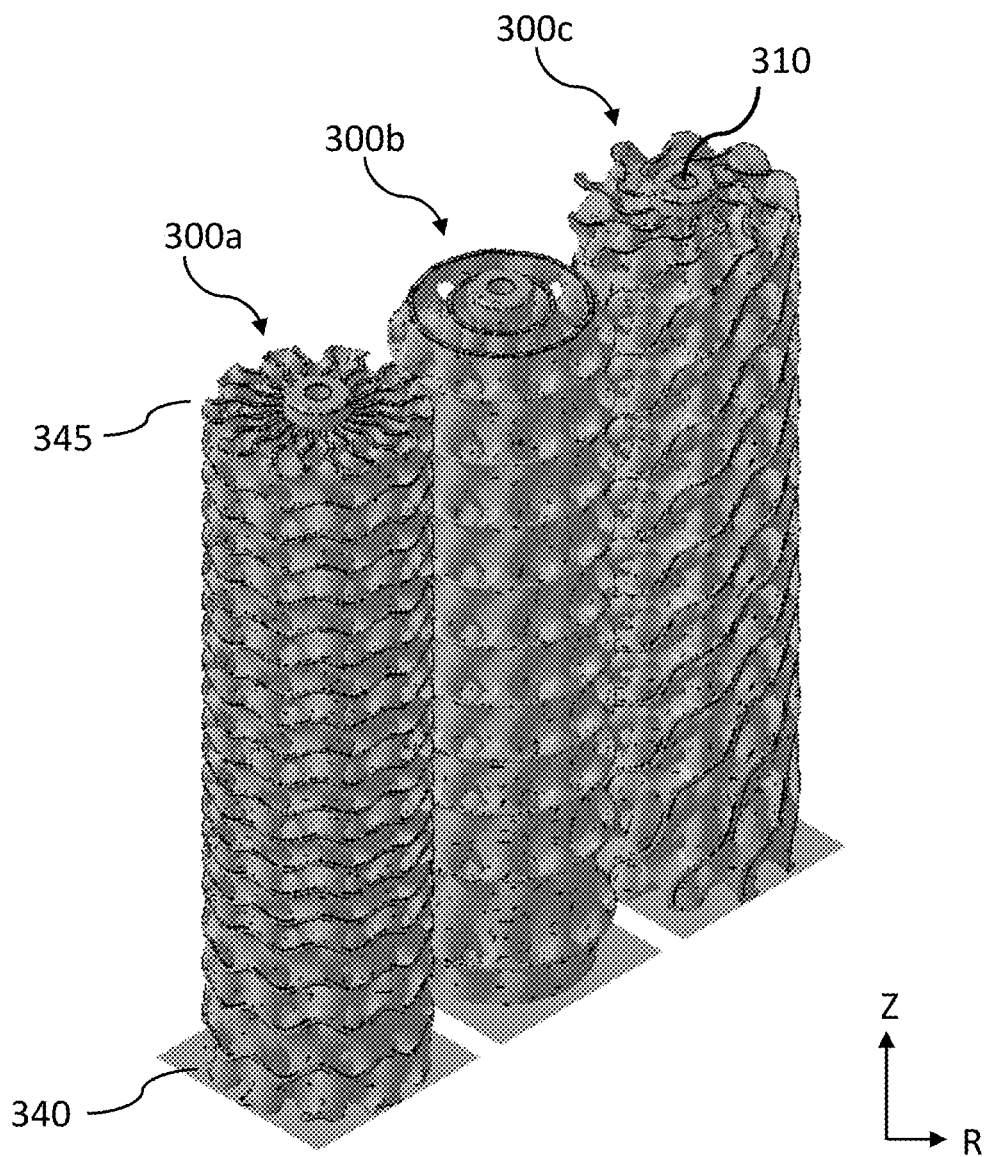
FIG. 3 provides isometric views of suppressor cores, in accordance with some embodiments.

FIG. 3 shows isometric views of three example suppressor cores 300a, 300b and 300c which utilize TPMS structures, in accordance with some embodiments. In this disclosure, suppressor cores (which may also be referred to herein as suppression cores) are the suppressor structures that fill all or some of an annular chamber in a suppression device, to serve as baffles. The outer main body of the suppressors is not shown in this illustration, to enable the TPMS structures to be viewed. In FIG. 3, each of the suppressor cores 300a-c has an entry end 340, which serves as an inlet for a projectile to enter the suppressor, and an exit end 345 which serves as an outlet. The center bore 310 is an open pathway along the central axis of the suppressor. The projectile travels through the center bore, and gases from the projectile also traverse the center bore and enter the suppressor core. The TPMS structures of suppressor cores 300a-c are cylindrical and arranged circumferentially around the center bore 310. That is, the TPMS structures have a plurality of unit cells arranged circumferentially around the center bore 310. The unit cells repeat in the longitudinal (Z) and radial (R) directions, where parameters of the unit cells may vary in the longitudinal and/or radial directions as shall be described throughout this disclosure. Suppressor core 300a uses a Schoen's Gyroid TPMS, suppressor core 300b uses a Schwarz CLP, and suppressor core 300c uses a Schwarz Batwing. However, other types of TPMS structures are possible.

Figure 4:
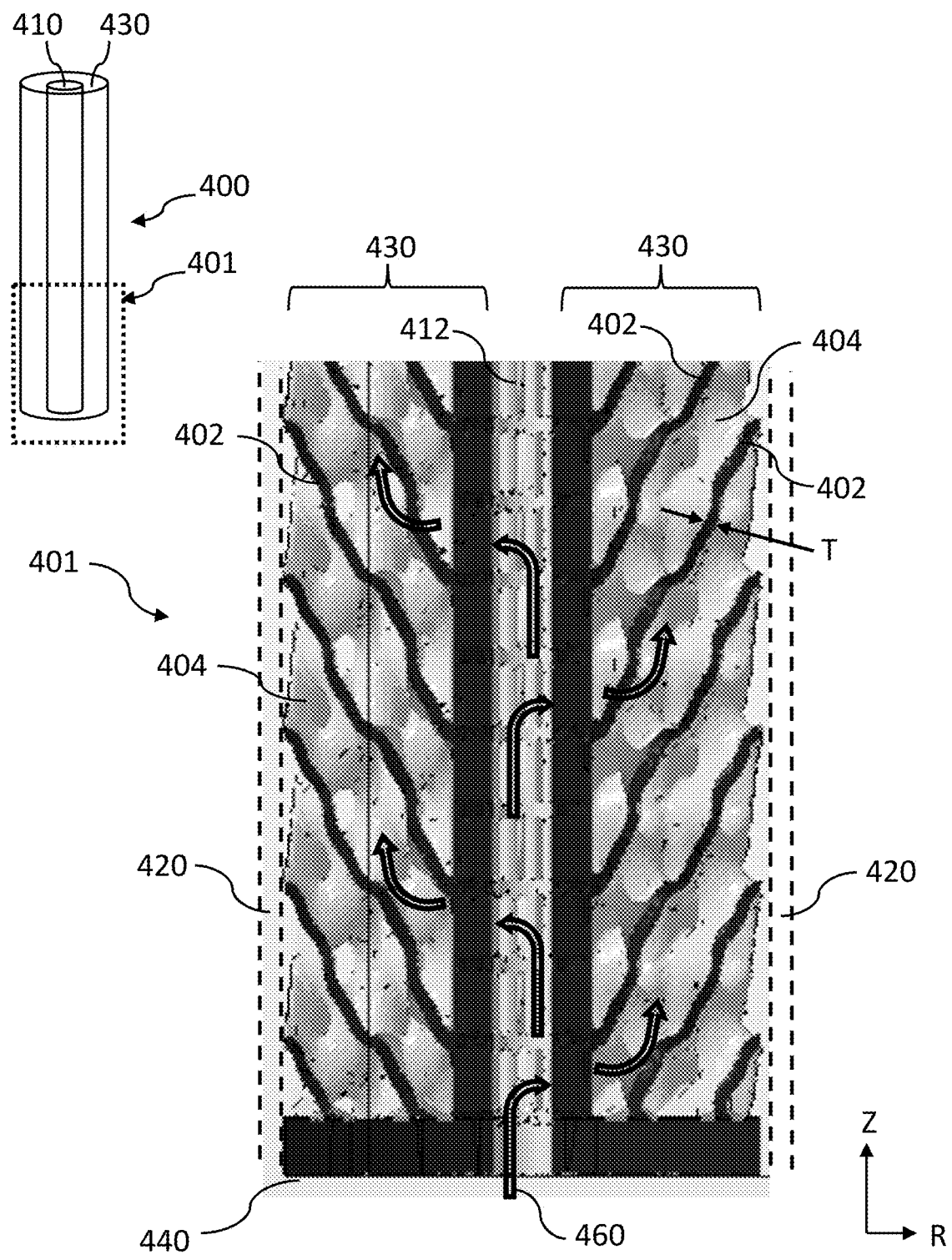
FIG. 4 provides a detailed, longitudinal cutaway view of a portion of a suppressor core, in accordance with some embodiments.

FIG. 4 is a close-up, longitudinal cutaway view 401 of a portion of a suppressor core 400 (entire view shown in the small inset) having a TPMS structure, in accordance with some embodiments. The TPMS structure is annularly cylindrical shaped (i.e., hollow cylinder, cylindrical shell) and fills at least a portion of, such as some or all, of the chamber 430. Chamber 430 is an annular cylindrical space having i) an outer diameter defined by an inner surface of the body 420 (body 420 shown in dashed lines for clarity in the close-up view) and ii) an inner diameter that is the diameter of the center bore 410. Thus, the suppressor core 400 is inside the main body 420. The TPMS structure is formed of walls 402 with wall thickness "T", where open spaces between the walls 402 form channels 404 within the TPMS structure. As can be seen by the repeating nature of the TPMS, the TPMS structure is periodic in the longitudinal direction and radial direction in this embodiment. Gases in the center bore 410, from firing a projectile, can enter the suppressor core 400 through a plurality of openings 412 at the inner diameter of the suppressor core 400, where the openings 412 are also connected to the channels 404. The channels 404 are continuously connected to each other due to the non-intersecting nature of the TPMS. The channels 404 provide flow pathways for gases to travel from the entry end 440 of the suppressor core 400, along the center bore 410, radially outward and along the length of the suppressor core 400 as shown by the arrows 460. The gases that enter the suppressor core 400 dissipate and become trapped as they traverse longitudinally along the suppressor and outward toward the main body 420.

The TPMS structures of the present disclosure provide improved performance over conventional suppressors by providing a high surface area-to-volume ratio to slow rapidly expanding gases and to cool the gases by serving as a heat sink where the gases transfer their heat energy into the suppressor structure. Because of the tortuous, connected pathways created in TPMS structures, energy is dissipated over a much longer time interval than in conventional suppressors, using the TPMS surfaces to trap the gases in effectively long channels. In embodiments, TPMS parameters are designed to create greatly elongated paths for the gases to flow in while traversing along the length of the suppressor and away from the center bore, and also to maximize the trapped gas volume for a given overall suppressor volume. The channels create turbulent flow which increases friction on the surfaces to slow the gases and then finally release the gases at the lowest possible pressure relative to the ambient pressure at the exit of the suppressor end. This expansion of gases in the increased volume created by the channels of the TPMS causes decreases in pressure, followed by further decreases in pressure as energy transfer (temperature change and heat transfer) from the gases to the suppressor core occurs. Thus, embodiments enable propellant gases to travel the furthest possible distance in a given (limited) volume while transferring their kinetic energy into friction and heat energy in the suppressor core and casing body. Propellant gases are efficiently ported away from the center bore in order to transfer them to the body of the suppressor.

The suppressors of the present disclosure achieve superior noise reduction while beneficially meeting other functional requirements of firearms. For instance, some firearms, such as automatic or semi-automatic weapons, include a gas port to activate a firearm's action. A certain gas pressure is needed for the firearm's action to work, but this gas-initiated action can sometimes result in gas blowback, which is back pressure that can impact the operator. The suppressors of the present disclosure trap gases efficiently and generally do not require significantly increased gas flow to cycle the weapon, such that blowback problems are mitigated.

The TPMS geometries and dimensions of the present disclosure are customized to be able to withstand the pressures and velocities of propellant gases involved in firearm projectiles, and also to address other factors that contribute to commercial feasibility such as manufacturability, user acceptance (e.g., size, weight) and cost. In some embodiments, properties or parameters can vary within the TPMS structure to tailor the performance of the suppressor.

To enable the maximum volume of gases to be trapped in the suppressor, some embodiments involve specifically designing segmented core structures to transition exhaust gases from the central bore to the extremities of the suppressor core. These special structures balance providing the largest amount of negative (open) space possible while still having a structure that is strong enough to withstand the forces and pressures applied by the projectile gases. In some embodiments, the structures are segmented radially, with an inner portion serving as an inlet for the gases to enter the suppressor structure from the center bore, and an outer portion providing noise suppression through expansion of gases and reducing gas pressure. This unique insight of using an inner portion to efficiently transfer gases from the center bore to an outer portion of the suppressor core provides greatly improved sound suppression performance compared to conventional devices.

Figure 5:
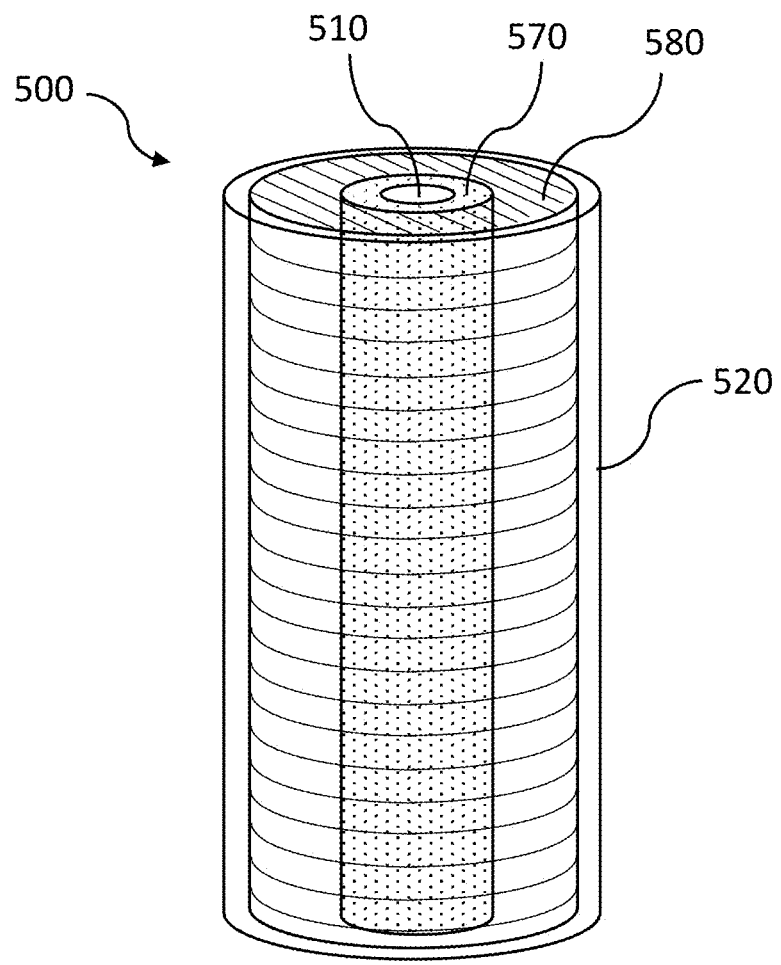
FIG. 5 is an isometric view schematic of a suppressor having a segmented suppressor core, in accordance with some embodiments.

FIG. 5 is a schematic representing embodiments in which different baffle geometries are utilized in different portions of a suppressor. The fill patterns in FIG. 5 are used to designate the individual regions of the suppressor 500, and do not indicate actual baffle geometries in those regions. In FIG. 5, the suppressor 500 has a radially segmented suppressor core that is made of an inner portion 570 and an outer portion 580. Inner portion 570 is adjacent to the center bore 510, and outer portion 580 surrounds the inner portion 570. Main body 520 surrounds the outer portion 580. The inner portion 570 and the outer portion 580 are concentric with each other and are both annular cylinders. The inner portion 570 provides channels that connect the center bore 510 to the outer portion 580, facilitating the flow of gases into the outer portion 580 for improved noise suppression. In various embodiments, the geometry of the baffle structures within the inner portion is different from those in the outer portion. For example, the inner portion may have baffles with a non-TPMS geometry, and the inner portion may be combined with an outer portion that is has baffles with a TPMS geometry. In another example, the inner portion may have baffles of a first type of TPMS geometry combined with an outer portion that has baffles of a second type of TPMS geometry, where the second type is different from the first type.

Figure 6A:
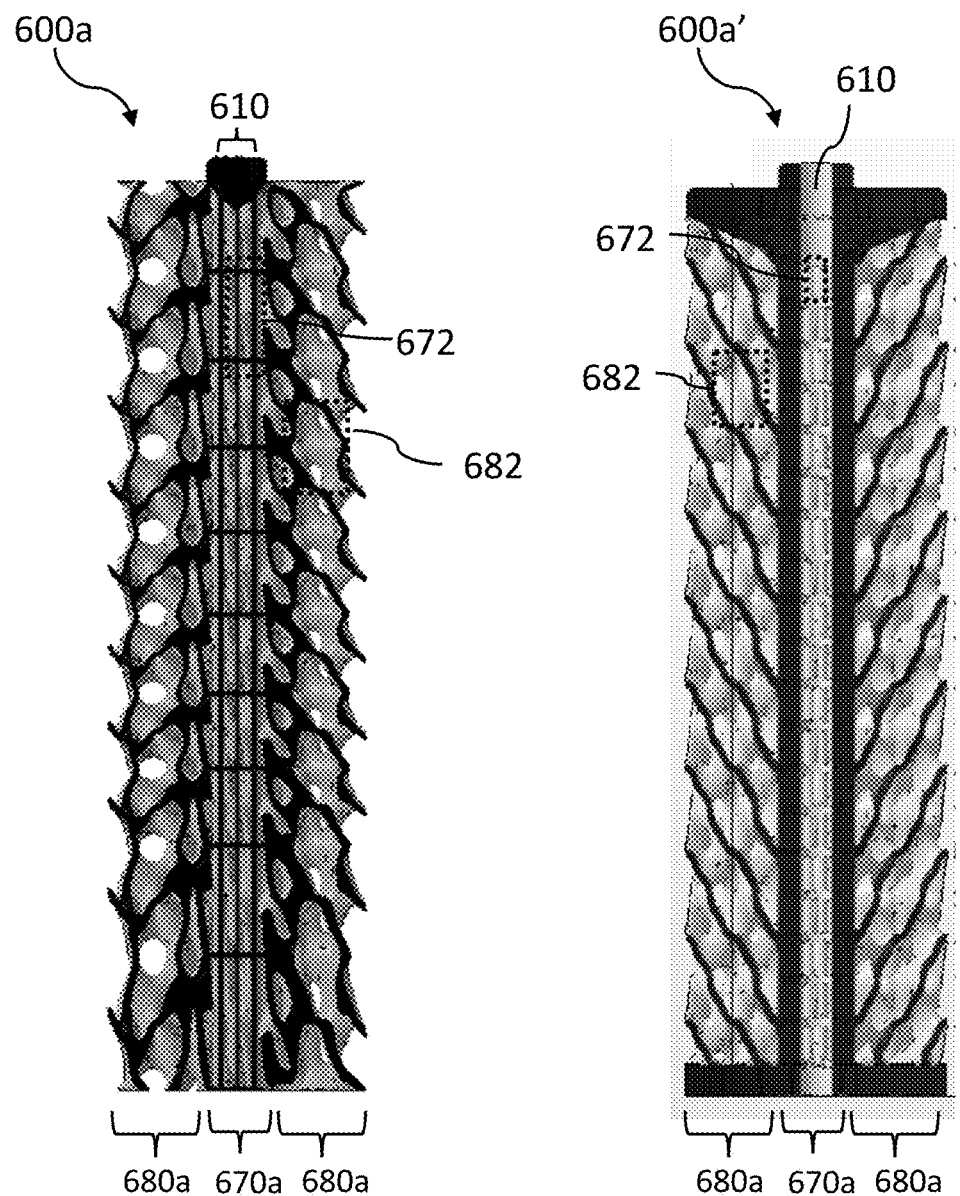

To demonstrate embodiments of FIG. 5 in which varying baffle geometries are used in a suppressor core, FIGS. 6A-6C and 7A-7C show longitudinal and radial cutaway views, respectively, of suppressor cores 600a, 600a', 600b and 600c. The main body of the suppressors are not shown in these figures, for clarity. Inner portions 670a, 670b and 670c are annular cylinders around center bore 610. In FIG. 6A, two cutaway views of similar suppressor cores 600a and 600a' are shown, where the illustration of suppressor core 600a' provides a clearer view of center bore 610. In the illustrated embodiments, the geometry of the baffle structures in the inner portions 670a, 670b and 670c have a rectangular cross-section in the longitudinal direction, and the geometry of the baffle structures in the outer portions 680a, 680b and 680c are TPMS. A rectangular unit cell 672 for the inner core portion 670a and a TPMS unit cell 682 for the outer core portion 680a of the suppressor cores 600a and 600a' are annotated. The TPMS in the outer portion 680a of suppressor core 600a and 600a' is a Schwarz Batwing, the TPMS of outer portion 680b of suppressor core 600b is a Schoen's Gyroid, and the TPMS of outer portion 680c of suppressor core 600c is a Schwarz CLP.

The specific types of geometries and dimensions for the inner and outer portions may be chosen based on the expected pressure, heat and noise that are expected to be produced for a particular firearm, depending on the type of firearm, caliber and/or barrel length. Modeling the merging of complex, differential TPMS geometries with each other or of a TPMS geometry with a non-TPMS geometry is not straightforward and requires complex computations. For instance, a more open (greater negative space) TPMS structure and unit cell size is ideal for carrying expanding gases away from the central bore, while tighter (smaller) unit cell sizes are ideal for creating the most elongated pathways for which the gases to travel. However, the initial pressures in this TPMS region of the suppressor core necessitate the strongest—and thus thickest—structure (positive space). The undertaking of weighing all of these variables, including looking at simulations such as finite element analyses (FEA), computational fluid dynamics (CFD), and programmatic CAD in the present embodiments help produce suppressor cores that best address the myriad of complicated processes taking place within the suppressor.

Figure 7C:
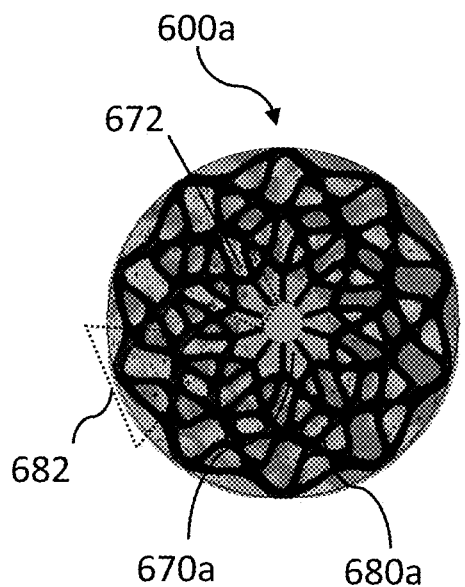
Figure 7C:
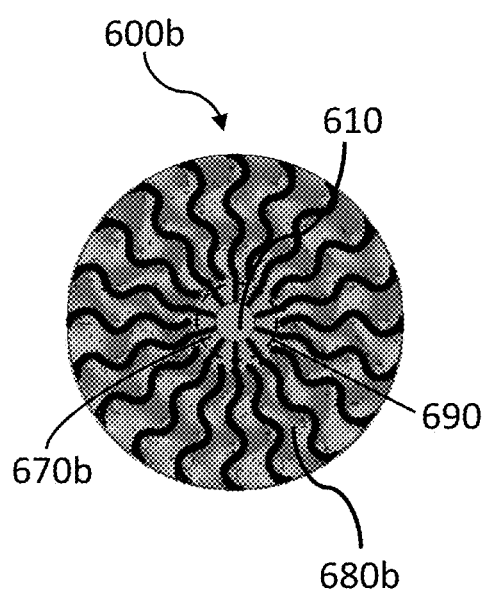
Figure 7C:
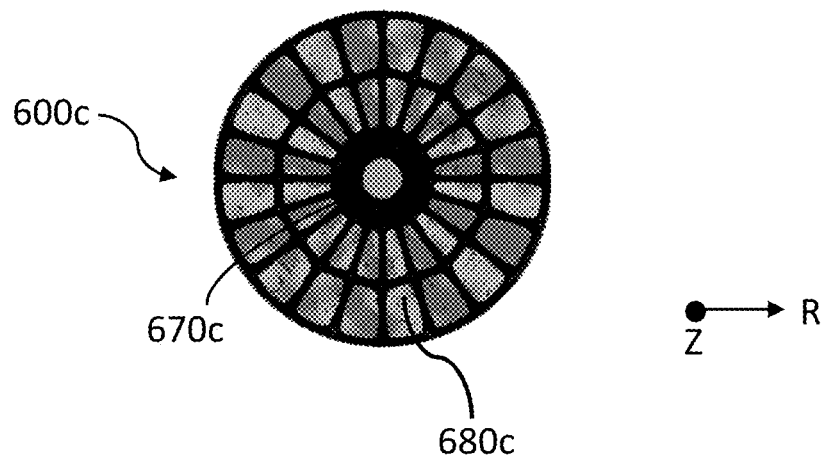

As can be seen in FIGS. 7A-7C, the TPMS geometry is radially arranged. That is, unit cells 672 and 682 of the TPMS are positioned around a central axis of the cylindrical suppressor and arranged circumferentially, fanning out around the center bore. This radial arrangement of TPMS unit cells beneficially facilitates the dissipation of energy from the central bore 610 toward the outer body of the suppressor. Note that the unit cells have a trapezoidal cross-section in these radial views due to the radial arrangement of the TPMS. The three-dimensional nature of the baffle geometries further emphasizes the complexity of creating continuous gas pathways between different portions of the suppressor cores in the present embodiments, such as at the transition 690 (dashed circle, FIG. 7B) between the inner portion and outer portion.

Figure 8A:
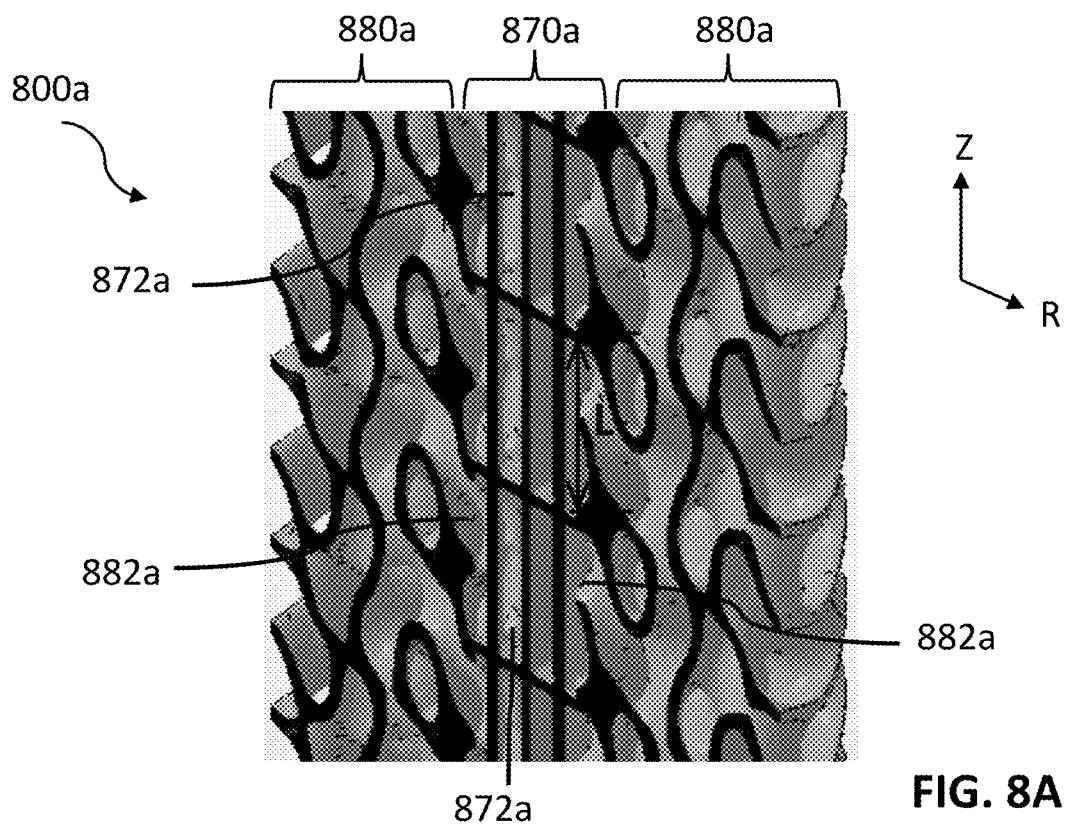
FIGS. 8A-8B are detailed, longitudinal cutaway views of portions of segmented suppressor cores, in accordance with some embodiments.
Figure 8B:
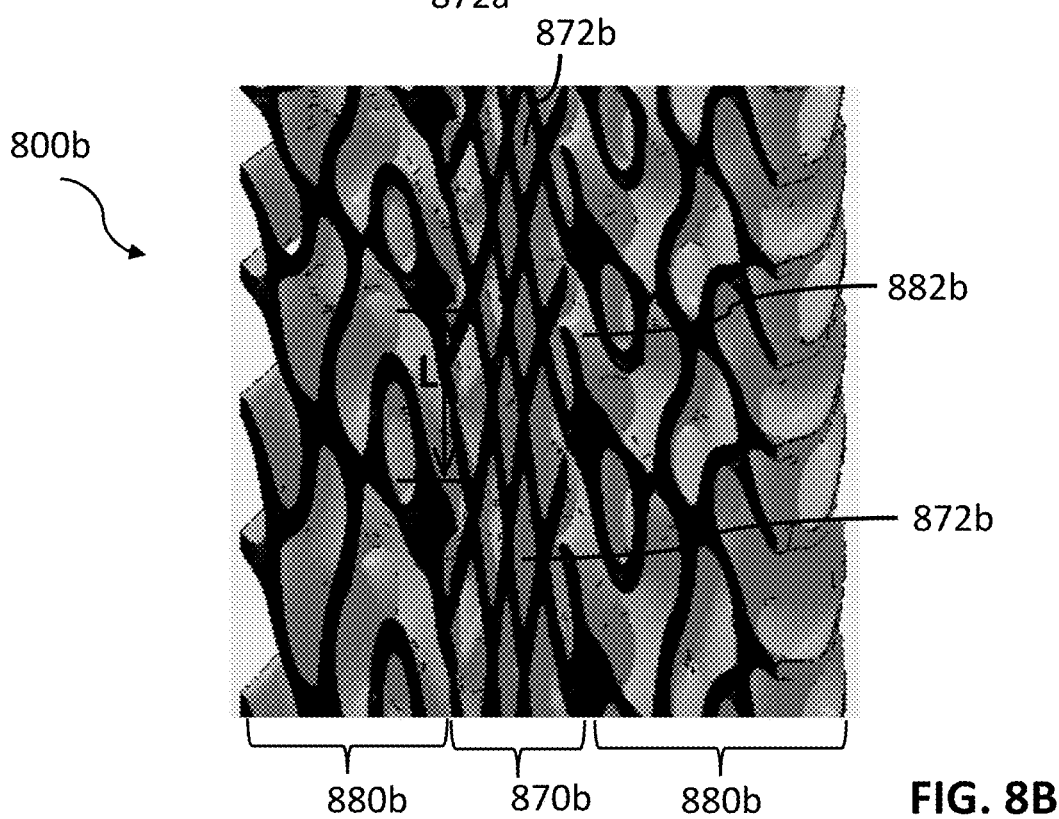

To further describe details of segmented suppressors, FIGS. 8A and 8B show close-up, cutaway longitudinal views of portions of two suppressor cores 800a and 800b. FIGS. 8A-8B illustrate a unique aspect in which dimensions at an interface between inner portions 870a-b and outer portions 880a-b are matched, in accordance with some embodiments. Matching the geometry of baffle channels (open areas) at the transition between the inner and outer portions of the suppressor core advantageously maximizes the amount of gases flowing from the central bore into the suppressor structure, while also taking into consideration other factors such as mechanical strength of the suppressor and weight (e.g., less material to reduce weight of the suppressor is desirable).

In FIG. 8A, inner portion 870a is configured as a rectangular array; that is, a structure having an array of openings with rectangular cross-sections in the longitudinal direction Z. The rectangular openings are formed by walls that form a first plurality of openings 872a, where the rectangles are elongated in the Z-direction in this illustration. The outer portion 880a is configured as a TPMS, having walls that form a second plurality of openings 882a. At a transition between the inner portion and the outer portion (i.e., where an outer edge of the inner portion joins an inner edge of the outer portion), a plurality of first openings in the inner portion forms continuous paths with a plurality of second openings in the outer portion. In particular, the sizes and locations of the first openings in the inner portion may be matched (e.g., approximately equal sizes and approximately aligned positions) with the second openings in the outer portion. For example, a parameter that is matched between inner and outer portions may be a length "L." In FIG. 8A, the cell structures in the inner portion 870a (having openings 872a) are tuned to have lengths L that match in size and that line up in location with the longitudinal periodic cell spacing of the TPMS outer portion 880a (having openings 882a of length also equal to L). The suppressor core 800b of FIG. 8B is similar to that of FIG. 8A but having a diamond-shaped array for the inner portion 870b. The diamond array has walls intersecting at acute and oblique angles to each other, forming a plurality of openings 872b that have a diamond cross-section in the longitudinal direction. The outer portion 880b is configured as a TPMS, having walls that form a second plurality of openings 882b. The length L of the long diamond diagonals of inner portion 870b is tuned to match the longitudinal periodic cell spacing of the openings 882b of the TPMS outer portion 880b (that also have length L), and the locations of the openings 872b and 882b are also approximately aligned with each other.

Designing at least one aspect or dimension (e.g., a parameter such as length, width, cross-sectional area, and/or shape of the unit cell/baffle geometry in the array) of the inner portion to approximately match in size with the corresponding aspect or dimension of the outer portion (e.g., length, width, cross-sectional area, and/or shape of the TPMS unit cell) can maximize the inlet area that the inner portion provides between the center bore and the suppressor core. The positions of the openings between the inner and outer portions may also be approximately aligned, such as at least 50% of the cross-sectional area of the openings (area of individual unit cells) in the inner and outer portions overlapping, or at least 70%, or at least 95%. This matching of a parameter and position can be designed into some or all of the interface between the inner portion and outer portion. That is, at least some of a plurality of first openings in the inner portion can match at least one parameter and have a location aligned with a plurality of second openings in the outer portion. For example, at least 50% of the openings in the inner portion, or at least 70%, or at least 95% may be configured to be positioned in alignment with and have a parameter (e.g., dimension, shape and/or size) matching with openings in the outer portion, at the location where the inner portion meets the outer portion.

The geometry of the inner portion (e.g., rectangular or diamond in FIGS. 8A-8B) to serve as an inlet for gases to enter the outer portion 880b may be chosen, for example, to most closely match the shape of the TPMS geometry of the outer portion. The inner portion geometry can also be chosen to facilitate the manufacturing process being used to make the suppressor. For example, a diamond array can facilitate 3D printing, in being self-supporting rather than requiring internal supports during printing. In some embodiments, TPMS structures may be used for the inner portion as well as the outer portion. For example, inner portions may comprise a Schoen's surface (e.g., individual types or hybrids such as T'-R, S'-S", T'-R'|H'-T; of various orders/genuses such as order 3 or 6). The TPMS geometry of the outer portion may be chosen based on the particular firearm specifications such as the type of firearm, caliber and/or barrel length. The TPMS structures of the inner and/or outer portions themselves may have other parameters that are also varying radially and/or longitudinally, which must be accounted for along with the baffle geometries being different from each other, and thus dimensional matching at the transition where the inner portion meets the outer portion is highly complex.

In addition to the baffle geometry of portions of the suppressor being varied, other parameters of the TPMS structures may be customized. For example, a wall thickness T (FIG. 4A) of a TPMS structure or non-TPMS structure in the suppressor may be designed to meet specifications of the particular firearm. For different calibers and barrel lengths, the thickness may be chosen based on explosive force and pressures. The higher the small arms ammunition pressure (SAAMI pressure) of the round, and the shorter the barrel of the weapon, the thicker and stronger the suppressor product that needs to be built. Wall thicknesses of suppressors in the present disclosure have lower bounds governed by the physical properties (e.g., tensile strength, impact strength) of the material that the walls are made of and by the resolution and minimum wall thickness capabilities of the method (e.g., particular type of 3D printing) being used to manufacture the device. Example wall thicknesses of the baffles in the suppressor core may be, for example, less than or equal to 5.0 mm, or less than or equal to 2.0 mm, or 0.1 mm to 3.0 mm, or 0.5 mm to 3.0 mm, or about 1.5 mm, or 0.5 to 1 mm. In general, higher wall thicknesses are needed for higher caliber weapons. However, stronger materials (e.g., metal alloy with a higher strength than another alloy) may allow for thinner wall thicknesses to be used than for a weaker material.

Figure 9A:
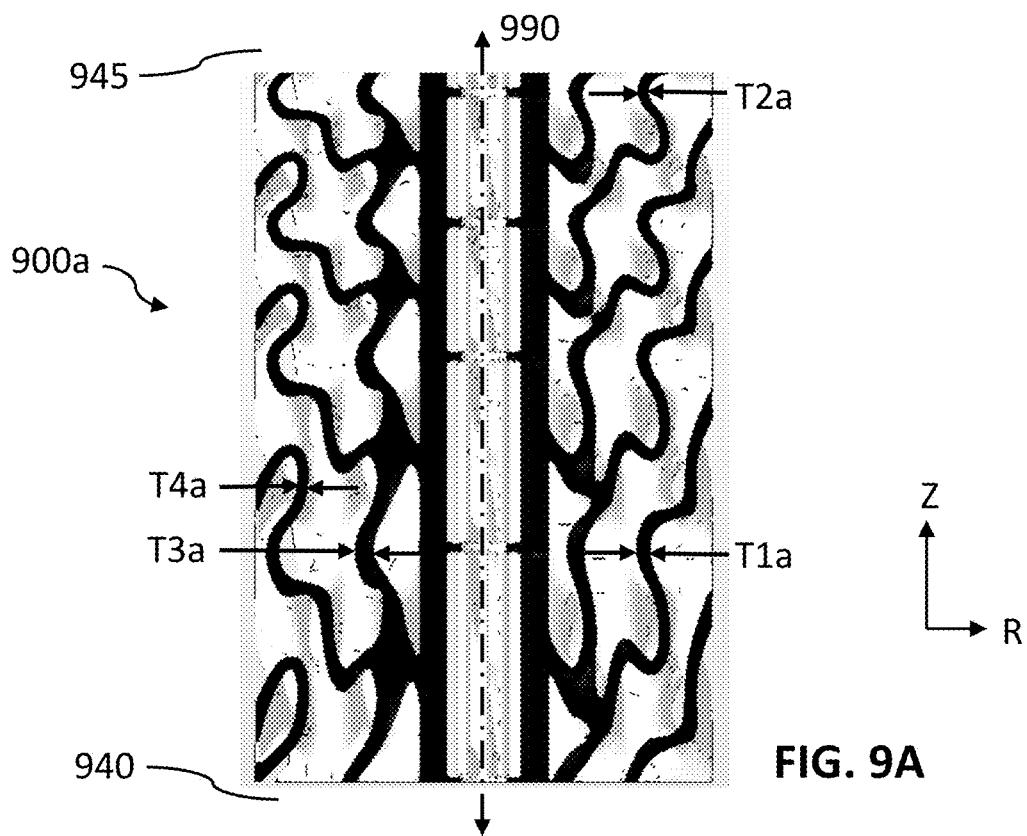
FIGS. 9A-9B show longitudinal cutaway views of portions of suppressor cores having varying wall thicknesses, in accordance with some embodiments.
Figure 9B:
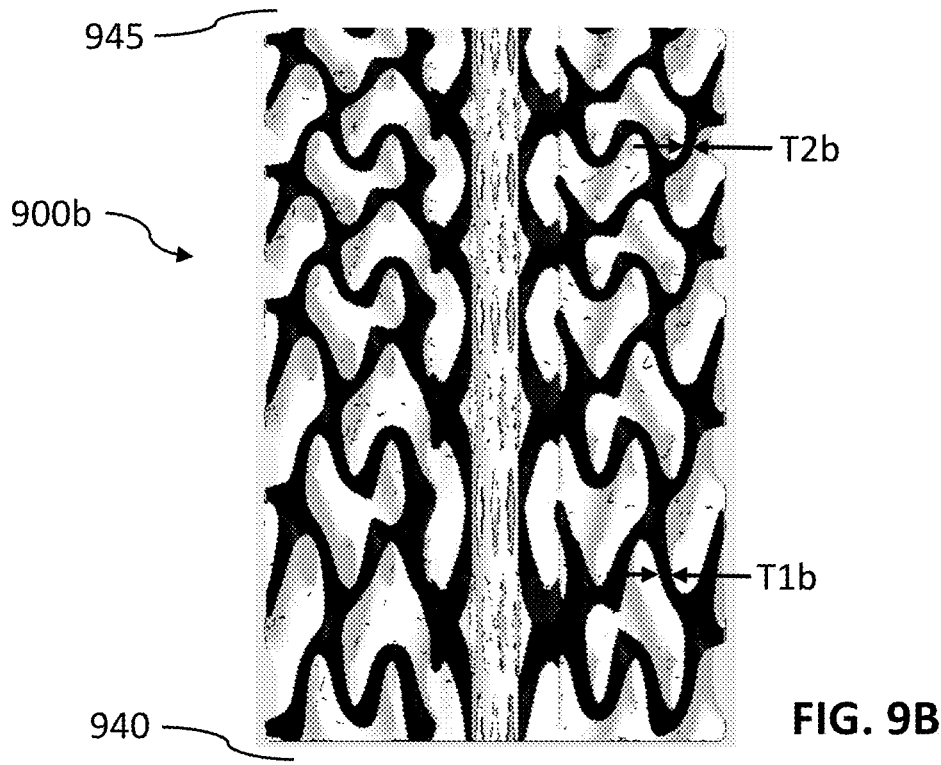

In some embodiments, the TPMS wall thickness in each unit cell may be constant throughout the entire structure. In other embodiments as demonstrated by FIGS. 9A-9B, thickness may vary within some or all of the suppressor, such as in a radial and/or longitudinal direction of the suppressor. FIG. 9A demonstrates an embodiment in which wall thickness decreases in the longitudinal direction Z, from thickness T1a which is closer to the entry end 940 of the suppressor core 900a, to thickness T2a which is closer to the exit end 945. Similarly, in suppressor core 900b of FIG. 9B, thickness T1b, which is closer to the entry end 940, is greater than thickness T2b which is closer to the exit end 945. FIG. 9A also illustrates wall thickness varying in the radial direction R, having a thickness T3a near the center axis 990 of the suppressor core 900a that is greater than thickness T4a at a greater radial distance (i.e., farther away) from the center axis 990.

From the relationship P=F/A where P is pressure, F is force and A is area, pressure is largely impacted by changing area. For a given force that will be applied by the exhaust gases of the firearm projectile, as the surface area within channels of the suppressor core increases (e.g., in length and/and or diameter of a channel in a TPMS), the pressure sharply decreases. As the pressure decreases, the wall thickness can be decreased, allowing for less material usage to achieve the same factor of safety compared to regions in the suppressor where higher pressure is experienced. Accordingly, in some embodiments, the suppressor core TPMS wall thicknesses and the material strength required to safely contain and control the expanding gases may be varied radially and/or longitudinally based on the decreasing pressures along the suppressor. The wall thicknesses may be varied according to governing equations including hoop stress ($\theta=P*r/t$, where $\theta$ is stress, P is internal pressure, r is radius and t is wall thickness), minimum wall thickness ($t=P*D/2*[S*E+P*Y]$, where t is wall thickness, D is diameter, S is allowable tensile stress, E is welding efficiency and Y is wall thickness coefficient), and mean effective cross-sectional area at any point along the length of the suppressor due to the ever-changing/repeating TPMS cross-section. Effects of manufacturing techniques are captured in these equations, such as the production method of the metals or alloys (e.g., seamless and drawn, or welded and drawn tubing/piping).

Figure 10A:
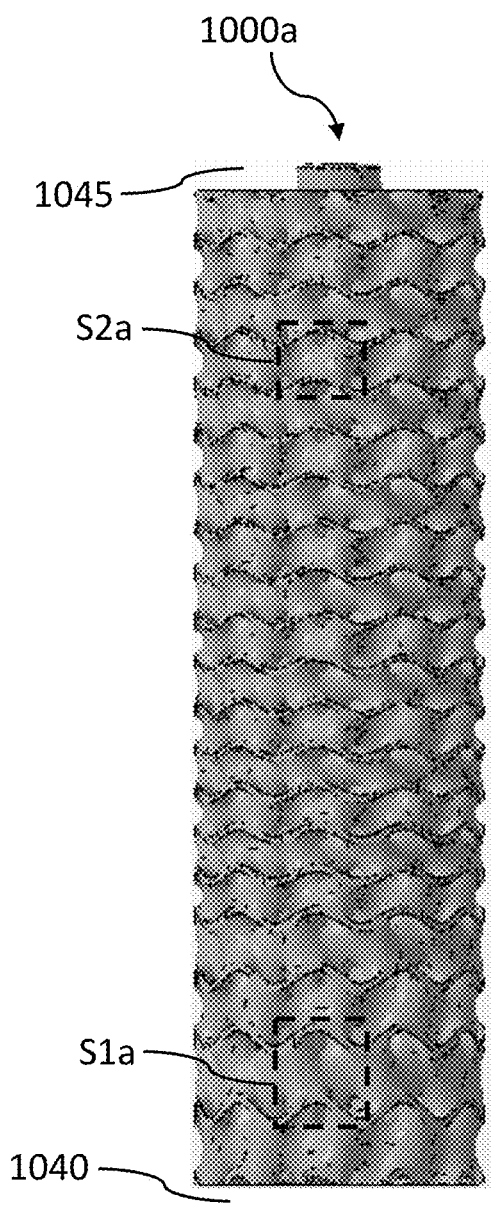
FIGS. 10A-10B are front views of TPMS structures in which the unit cell size varies in a longitudinal direction, in accordance with some embodiments.
Figure 10B:
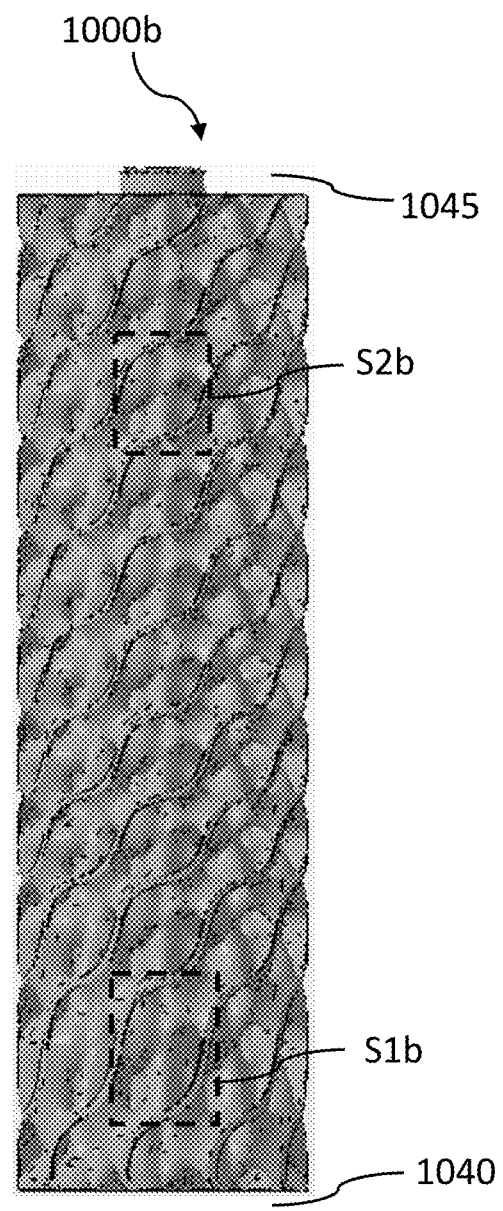
Figure 10C:
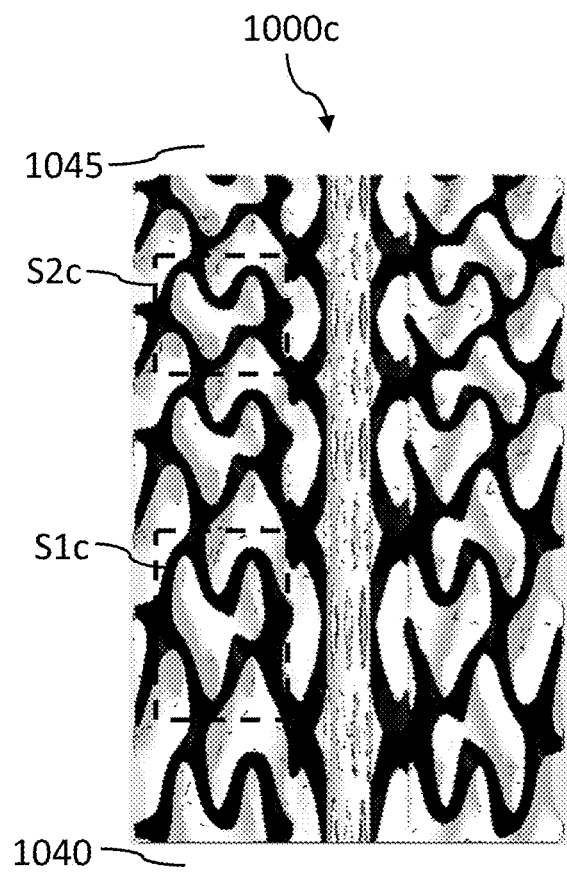
FIGS. 10C-10D are vertical cutaway views of portions of TPMS structures in which the unit cell size varies in a longitudinal direction, in accordance with some embodiments.
Figure 10D:
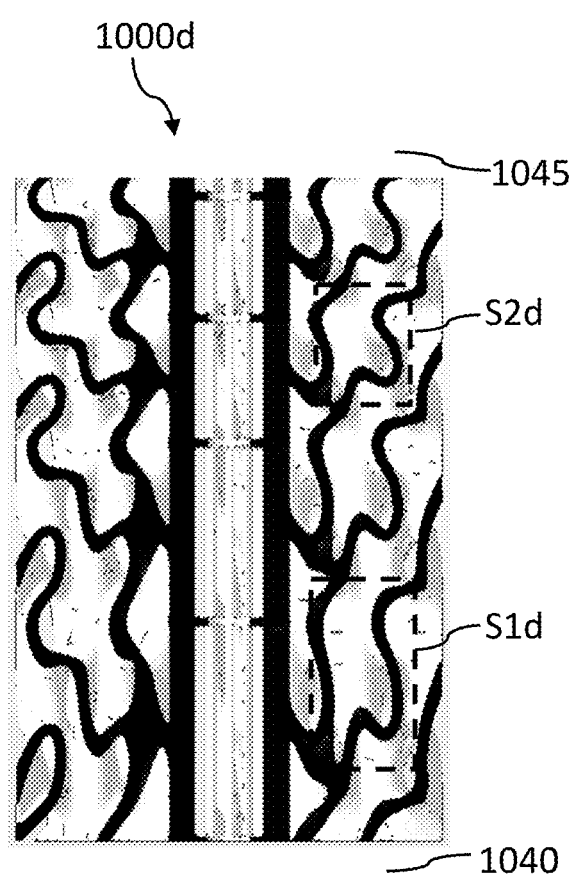

In some embodiments, the unit cell size of the TPMS may vary in some or all of the suppressor. FIGS. 10A-10B are front views and FIGS. 10C-10D are partial vertical cutaway views of TPMS structures in which the unit cell size varies in a longitudinal direction. In suppressor 1000a of FIG. 10A, which has a Gyroid baffle geometry, the unit cell size S1a near the entry end 1040 of the suppressor 1000a is greater than the unit cell size S2a near the exit end 1045. In suppressor 1000b of FIG. 10B, which has a Batwing baffle geometry, the unit cell size S1b near the entry end 1040 of the suppressor 1000b is greater than the unit cell size S2b near the exit end 1045. Similarly, the cutaway view of suppressor 1000c in FIG. 10C, which has a diamond array inlet (inner portion) and a TPMS outer portion, shows a unit cell S1c of the outer portion decreasing in size to unit cell S2c from the entry end 1040 toward the exit end 1045. Suppressor 1000d in FIG. 10D, having a rectangular array inlet (inner portion) and TPMS outer portion, shows a unit cell S1d of the outer portion decreasing in size to unit cell S2d from the entry end 1040 toward the exit end 1045.

In these examples, the heights of the unit cells decrease from the entry end toward the exit end while the widths are approximately the same. However, in other embodiments other dimensions (e.g., width, radial depth) of the unit cell may change instead of or in addition to the height. Additionally, the unit cell size can vary in one or more portions of the suppressor, or along the entire suppressor. For example, TMPS unit cell sizes may be decreased in a longitudinal direction from larger expansion channels near the entry end of the suppressor to smaller expansion channels near the exit end. This longitudinal decrease in unit cell size may be utilized to provide the expanding gases an initial volume to expand into, which decreases the gas pressures, and then to force the gases into smaller and smaller volumes along tortuous and labyrinthine pathways through the TPMS. The benefit of varying unit cell sizes may be further explained by using the analogy of hoop stress of pressure vessels, in that the smaller the mean diameter or cross-section, the smaller the minimum wall thickness required to produce a safe product.

Combinations of variations in suppressor characteristics such as baffle geometry (e.g., different inner and outer radial portions instead of the same baffle geometry throughout the suppressor core), wall thickness, and unit cell size can be used together in various embodiments. The particular combinations used can be based on the specifications of the firearm for which the suppressor is being designed (e.g., firearm type, caliber, noise reduction goals) and other customer requirements. In general, decreasing the amount of material required for building the suppressor helps to reduce weight of the device to improve ease of use for the operator and to reduce material cost. In suppressor design, minimum weight is extremely important, where every ounce counts in device performance and customer acceptance.

In some embodiments, a wall thickness or a unit cell size of the TPMS structure varies along the longitudinal direction in the chamber. In such embodiments, a noise suppressor for a firearm includes a cylindrical body extending along a longitudinal direction, a chamber having an annular cylindrical shape, and a suppression core in the chamber. The chamber has i) an outer diameter defined by an inner surface of the body, ii) an inner diameter forming a center bore, and iii) a length along the longitudinal direction. The suppression core has a TPMS structure. A wall thickness or a unit cell size of the TPMS structure varies along the longitudinal direction in the chamber. The TPMS structure comprises a plurality of unit cells arranged circumferentially around the center bore. The length of the chamber has an entry end and an exit end opposite the entry end, the entry end being configured to be adjacent to a muzzle of a firearm. In some embodiments, the wall thickness of the TPMS structure decreases between the entry end and the exit end. In some embodiments, the unit cell size of the TPMS structure decreases between the entry end and the exit end. In some embodiments, the wall thickness varies in the longitudinal direction and in a radial direction. In some embodiments, the unit cell size varies in the longitudinal direction and in a radial direction. In various embodiments, the suppression core has an inner portion adjacent to the center bore and an outer portion surrounding the inner portion, where the inner portion and the outer portion are concentric, the outer portion comprises the TPMS structure, and at a transition between the inner portion and the outer portion, a plurality of first openings in the inner portion and a plurality of second openings in the outer portion have a parameter that matches in size with each other, and the plurality of first openings and the plurality of second openings are approximately aligned with each other. In some embodiments, a first baffle geometry of the inner portion may be different from a second baffle geometry of the outer portion.

In some embodiments, a wall thickness of the TPMS structure varies in a radial direction in the chamber. In such embodiments, a noise suppressor for a firearm includes a cylindrical body extending along a longitudinal direction, a chamber having an annular cylindrical shape, and a suppression core in the chamber. The chamber has i) an outer diameter defined by an inner surface of the body, ii) an inner diameter forming a center bore, and iii) a length along the longitudinal direction. The suppression core has a TPMS structure. A wall thickness of the TPMS structure varies in a radial direction in the chamber. The TPMS structure comprises a plurality of unit cells arranged circumferentially around the center bore. The wall thickness of the TPMS structure may decrease from the center bore to the outer diameter of the chamber. In various embodiments, the suppression core has an inner portion adjacent to the center bore and an outer portion surrounding the inner portion, the inner portion and the outer portion are concentric, the outer portion comprises the TPMS structure, and at a transition between the inner portion and the outer portion, a plurality of first openings in the inner portion and a plurality of second openings in the outer portion have a parameter that matches in size with each other, and the plurality of first openings and the plurality of second openings are approximately aligned with each other. In certain embodiments, the parameter is a length in the longitudinal direction of the chamber, where each first opening in the plurality of first openings has a first length in the longitudinal direction of the chamber, and at the transition between the inner portion and outer portion, each second opening in the plurality of second openings has a second length in the longitudinal direction matching the first length. In some embodiments, the inner portion comprises an array of structures having rectangular or diamond shaped cross-sections in the longitudinal direction.

In some embodiments, the suppression structure has a baffle geometry that varies in a radial direction. In such embodiments, a noise suppressor for a firearm includes a cylindrical body extending along a longitudinal direction, a chamber having an annular cylindrical shape, and a suppression core in the chamber. The chamber has i) an outer diameter defined by an inner surface of the body, ii) an inner diameter forming a center bore, and iii) a length along the longitudinal direction. The suppression core has an inner portion adjacent to the center bore and an outer portion surrounding the inner portion, the inner portion and the outer portion being concentric. The outer portion comprises a triply periodic minimal surfaces structure. At a transition between the inner portion and the outer portion, a plurality of first openings in the inner portion and a plurality of second openings in the outer portion have a parameter that matches in size with each other, and the plurality of first openings and the plurality of second openings are approximately aligned with each other. The TPMS structure has a plurality of unit cells arranged circumferentially around the center bore. In some embodiments, the parameter is a length in the longitudinal direction of the chamber, where each first opening in the plurality of first openings has a first length in the longitudinal direction of the chamber, and at the transition between the inner portion and outer portion, each second opening in the plurality of second openings has a second length matching the first length. In various embodiments, the inner portion comprises an array of structures having rectangular or diamond shaped cross-sections in the longitudinal direction. In various embodiments, the inner portion comprises a second TPMS structure that is different from the TPMS structure of the outer portion. In various embodiments, the length of the chamber has an entry end and an exit end opposite the entry end, the entry end being configured to be adjacent to a muzzle of a firearm, where a wall thickness of the TPMS structure decreases between the entry end and the exit end.

Figure 11:
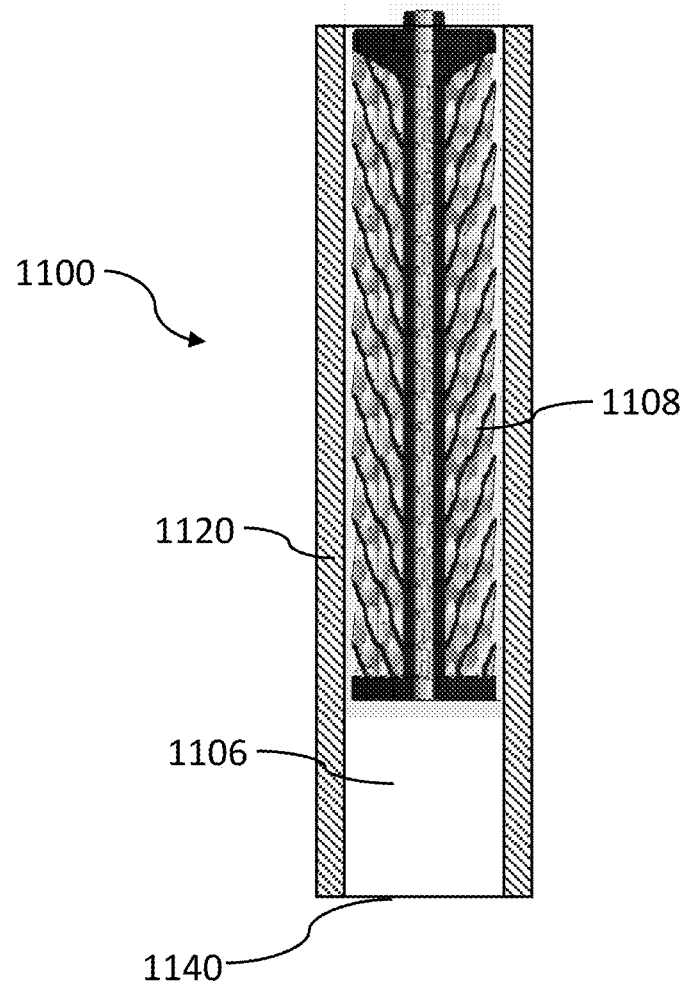
FIG. 11 is a vertical cross-section of a suppressor having an expansion chamber, in accordance with some embodiments.

In some embodiments, a suppressor core having a TPMS structure can occupy the entire chamber as shown in FIG. 5. In other embodiments, a TPMS type of suppressor core can extend partially along the length of the suppressor assembly and/or partially in the radial volume of the chamber. For example, FIG. 11 shows a suppressor 1100 with a main body 1120 that encloses an expansion chamber 1106 located at the entry end 1140 (muzzle end) of the suppressor 1100. The expansion chamber 1106 is an open space in the main body 1120, without any suppressor core in it, to provide an initial high-volume region for propellant gases to expand. The gases would then proceed into the suppressor core 1108 that is configured with a TPMS structure.

The TPMS suppressors of the present disclosure are not straightforward to derive from conventional designs due to their complexity, and in fact are counterintuitive. For instance, the increased amount of pathways in TPMS designs compared to conventional baffles results in more material required, which would be expected to increase the weight and cost of the device. However, with the uniquely customized designs of the present disclosure, such as varying the baffle geometry, wall thickness and/or unit cell size to reduce the amount of material in regions of the suppressor where pressures are lower, the issues of weight and cost increases are overcome such that weights and costs of the present suppressors may be comparable to or better than conventional devices. In another example, the complex structure of a TPMS makes it extremely difficult to clean compared to conventional designs where gas pathways can be easily accessed and/or baffle sections can be disassembled for cleaning. In some embodiments, suppressors incorporating TPMS structures can be cleaned with an ultrasonic cleaning system and fluid to impart ultrasonically-induced non-inertial cavitation on the surface of the suppressor core to remove carbon build-up. In some embodiments, the ultrasonic fluid may be heated and may utilize specialized fluids to enhance the removal of the carbon build-up.

In some embodiments, suppressors having TPMS structures in accordance with the present disclosure are fabricated using additive manufacturing, which is also known as three-dimensional (3D) printing. Various materials are possible for the present suppressors, such as metals, alloys, polymers and ceramics. Examples of 3D printing processes that are possible for manufacturing the present suppressors include powder bed fusion, binder jetting, fused filament fabrication (FFF), direct metal laser sintering (DMLS), and selective laser melting (SLM). In other embodiments, the suppressors may be fabricated using other techniques such as casting methods.

Figure 12:
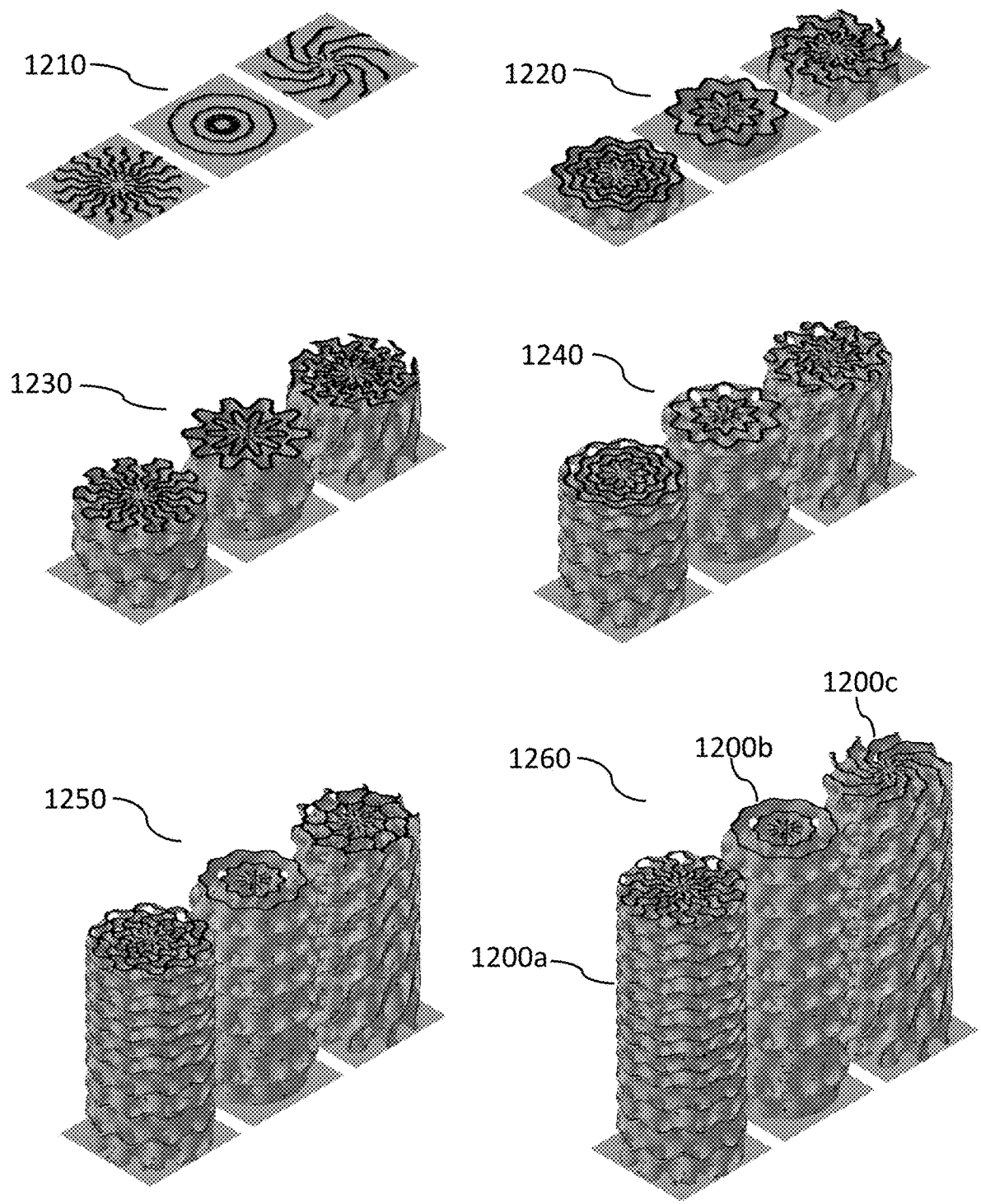
FIG. 12 shows isometric views of suppressor cores in different stages of being built by additive manufacturing, in accordance with some embodiments.

FIG. 12 shows perspective views of three suppressor structures (i.e., cores) 1200a, 1200b and 1200c being built by additive manufacturing. The suppressor structures 1200a, 1200b and 1200c demonstrate different TPMS geometries. On a build platform shown in a beginning stage 1210, material layers are built upon each other, with each layer being formed according to the desired TPMS structure geometry. Intermediate stages 1220, 1230, 1240 and 1250 show more and more layers being added, to result in the final stage 1260 with completed suppressor structures 1200a, 1200b and 1200c. The embodiment of FIG. 12 shows entire suppressor cores being built as one piece. However, in other embodiments, partial lengths of suppressor cores can be built and then assembled together. For instance, if a 3D printer is limited in the size of a part that can be produced, two or more lengthwise portions of a core can be built individually and then joined together by welding or other bonding methods. In another example, for a radially segmented suppressor core, an inner portion could be made separately from an outer portion. For these multi-piece assemblies, the portions can include alignment features to ensure that the TPMS pathways between the suppressor portions are matched up to form continuous channels.

In one example of manufacturing a suppressor assembly using binder jetting for 3D printing, methods involve depositing a liquid binder agent onto a layer of metal powder particles in areas where the part is to be formed. The liquid binder bonds the powder particles together, and then additional layers of powder and liquid binder are added to build the part. Beneficially, the loose particles of the powder layer support the printed part, eliminating the need for a build plate and enabling complex geometries to be created.

Figure 13:
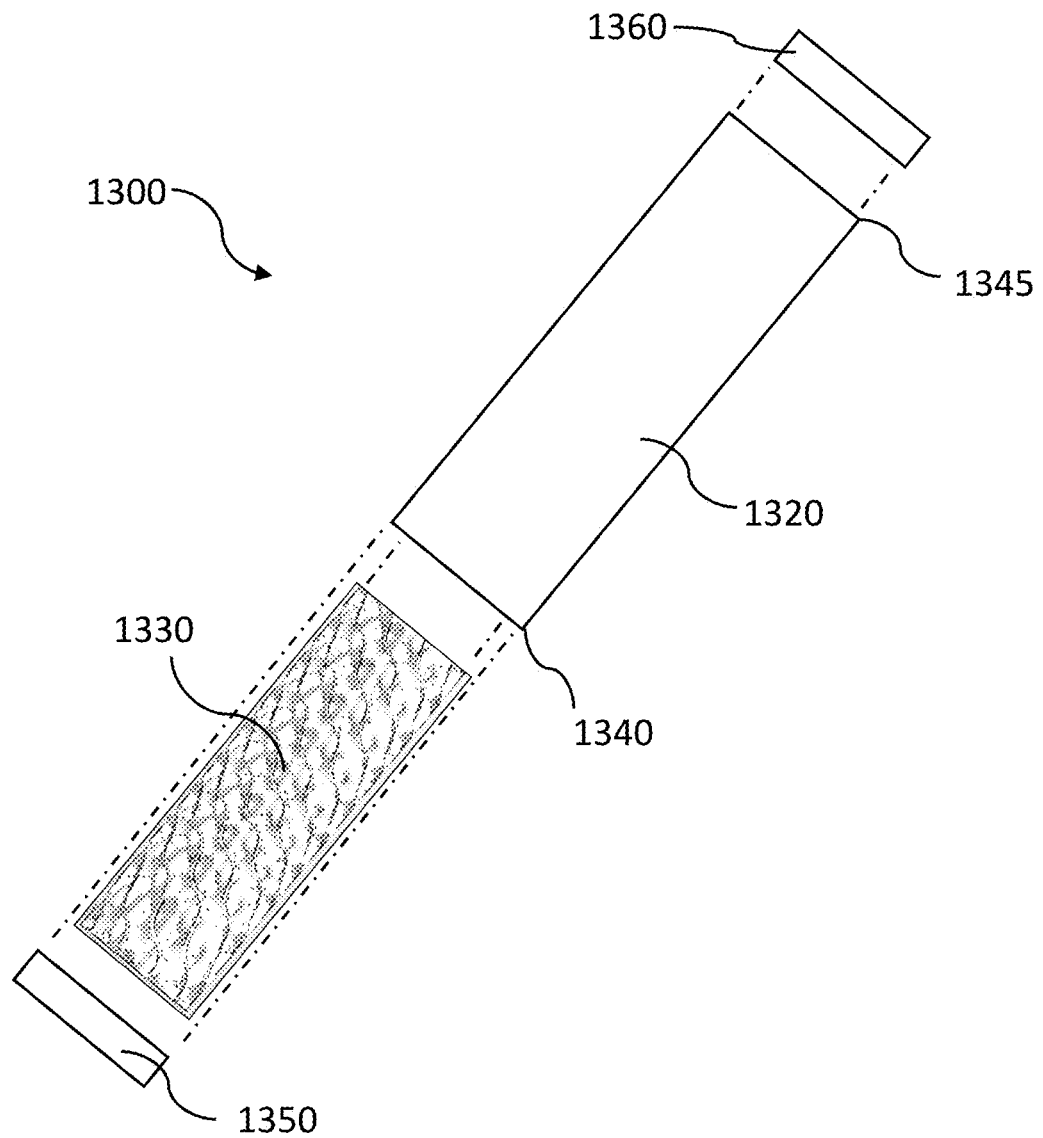
FIG. 13 is an exploded view of a suppressor assembly, in accordance with some embodiments.

FIG. 13 is an exploded view schematic of a suppressor assembly 1300 made of a main body 1320 (i.e., outer tube, casing), a suppressor core 1330 having a TPMS structure, a baseplate 1350 and an endcap 1360. The suppressor core 1330 is inserted into the body 1320. The baseplate 1350 is coupled to the entry end 1340 of the suppressor 1300, for attaching the suppressor to a firearm barrel, and an endcap 1360 attaches to the exit end 1345. The components may be screwed and/or welded together to contain the TPMS structure inside the body 1320. In some embodiments, the baseplate 1350, body 1320 and endcap 1360 may be machined out of metal. In some embodiments, the suppressor structure (core 1330) and the body 1320 (i.e., casing) are both 3D printed, either as separate components or as a monolithic piece. For pistols, on non-fixed barrel models, the addition of a linear inertial decoupler (LID), Nielsen device, or recoil booster may be added to the system.

Examples of metals and metal alloys that may be used for the present suppressors include 17-4 stainless steel, 316L stainless steel, titanium (e.g., Ti64), INCONEL® (e.g., Inconel 625 and 718) and combinations thereof. Example polymers that may be used, such as for smaller caliber firearms, include polyamides and acrylates. Example ceramics include alumina, carbide and zirconia.

Materials can be chosen based on impact strength, thermal conductivity, heat deflection temperature (polymers) and working temperature (ceramics, alloys). Some embodiments may utilize the same material for all the suppressor assembly components shown in FIG. 13, while other embodiments may use different materials for different components. Some embodiments may use the same material throughout the entire suppressor structure 1330, while in other embodiments the material may vary in different parts of the suppressor structure such as to reduce weight and/or material cost. For example, the highest heat requirements and most stringent tensile strength needs are in the entry region into the suppressor body (i.e., near entry end 1340 of FIG. 13). In this entry region, high-heat alloys such as nickel-based alloys, titanium-based alloys, martensitic precipitation hardened stainless steels, or austenitic stainless steels can be used for strength and heat tolerance. Other parts of the suppressor (e.g., toward the outlet region near exit end 1345) can be constructed of less advanced or less complex materials, or materials with weaker mechanical properties.

Figure 14:
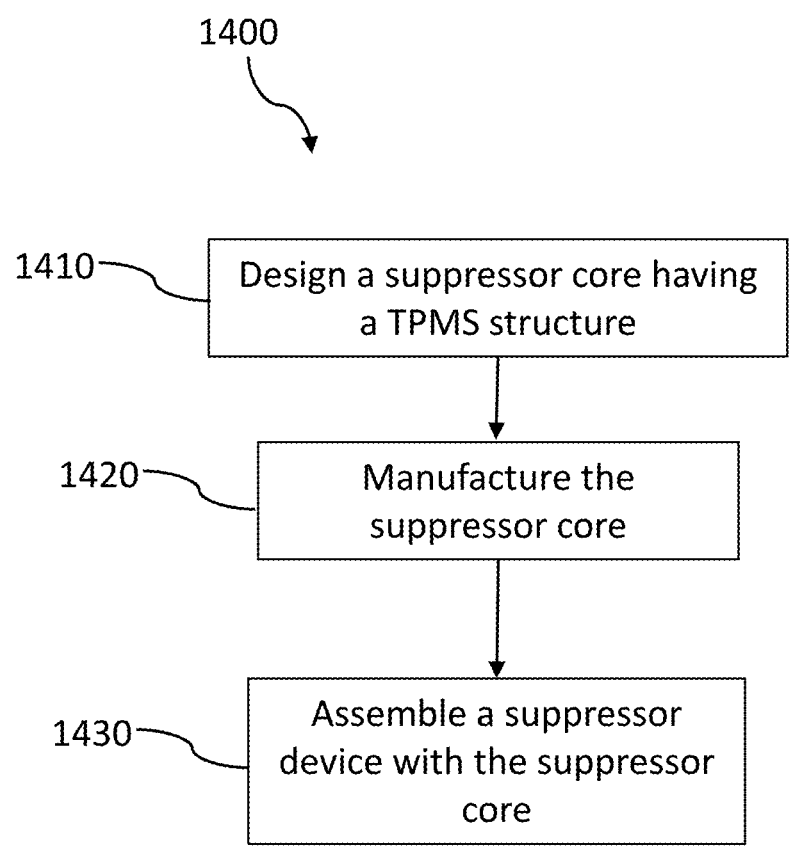
FIG. 14 is a flowchart of methods for making a suppressor, in accordance with some embodiments.

FIG. 14 is a flowchart 1400 describing methods of making a suppressor having a TPMS structure, in accordance with some embodiments. In step 1410, a suppressor core having a TPMS structure is designed. The designing may include varying one or more parameters in a radial and/or longitudinal direction, such as varying baffle geometry, wall thickness, and/or unit cell size. The TPMS structure may encompass the entire suppressor core or may occupy a portion. For example, the TPMS structure may be used in an outer portion of the suppressor core, with a different baffle geometry being used in an inner portion, where the inner portion serves as an inlet for gases from the center bore to flow to the outer portion. The inner portion may be a non-TPMS structure or a TPMS structure. The designing in step 1410 may also include matching a parameter and location of the openings at a transition between the inner portion and the outer portion.

In step 1420, the suppressor core is manufactured. The core may be made using, for example, 3D printing methods or investment casting. The entire suppressor core may be made as one integral piece or may be made in sections that are assembled together. The suppressor core may be made separate from or integral with other components of the suppressor, such as the outer body, endcap and/or baseplate. The same material may be used in the suppressor core, or different materials can be used in different regions of the suppressor core. In step 1430, the suppressor device is assembled by placing the suppressor core inside the outer body/casing, with a baseplate on the entry end and an endcap on the exit end.

Example

In an experimental device, a Schwarz CLP geometry was used as the TPMS structure, in combination with a rectangular inlet array (inner portion), for a suppressor comprised of a combination of 17-4 stainless steel and titanium components on a conventional AR-15 firearm with 16-inch barrel and M855 5.56 mm ball ammunition. The noise output was measured at approximately 127 dB, compared to conventional state-of-the-art suppressors which have outputs of 132-134 dB. Since the dB scale is logarithmic, a few dBs represent a large perceived change. For example, a decrease of 3 dB equates to half the sound energy, which translates to approximately a 23% decrease in loudness. A 10 dB difference lowers the perceived sound level by half. The noise at a shooter's ear can be higher than the muzzle noise with a suppressor, depending on firearm type and action. The measured output of 127 dB in this experimental example would enable the sound at the shooter's ear to be below the MILSPEC limit of 140 dB, which would be monumental for soldiers' hearing protection, while also not requiring them to use hearing protection.

Reference has been made to embodiments of the disclosed invention. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only and is not intended to limit the invention.

What is claimed is:

1. A suppressor for a firearm comprising:
   a suppression core comprising an annular cylinder surrounding a center bore, and a baffle structure surrounding the annular cylinder, the annular cylinder and the baffle structure being concentric;
   wherein the baffle structure comprises a triply periodic minimal surfaces (TPMS) structure; and
   wherein at a transition between the annular cylinder and the baffle structure, a plurality of first openings in the annular cylinder form continuous paths with a plurality of second openings in the baffle structure.

2. The suppressor of claim 1 wherein a wall thickness of walls in the TPMS structure varies in a longitudinal direction.

3. The suppressor of claim 1 wherein a wall thickness of walls in the TPMS structure varies in a radial direction.

4. The suppressor of claim 1 wherein a wall thickness of walls in the TPMS structure is constant throughout the TPMS structure.

5. The suppressor of claim 1 wherein a unit cell size of the TPMS structure varies in a longitudinal direction.

6. The suppressor of claim 1 wherein a unit cell size of the TPMS structure varies in a radial direction.

7. The suppressor of claim 1 wherein the plurality of first openings in the annular cylinder and the plurality of second openings in the baffle structure have a parameter that matches in size with each other, and the plurality of first openings and the plurality of second openings are approximately aligned with each other.

8. The suppressor of claim 7 wherein:
   the parameter is a length in a longitudinal direction of the suppression core;
   each first opening in the plurality of first openings has a first length in the longitudinal direction; and
   at the transition between the annular cylinder and the baffle structure, each second opening in the plurality of second openings has a second length in the longitudinal direction matching the first length.

9. The suppressor of claim 1 wherein the annular cylinder comprises an array of structures having rectangular cross-sections in a longitudinal direction.

10. The suppressor of claim 1 wherein the TPMS structure comprises a Batwing geometry.

11. A suppressor for a firearm comprising:
    a suppression core comprising an annular cylindrical shape having a center bore, the suppression core comprising a triply periodic minimal surfaces (TPMS) structure;
    wherein the TPMS structure has walls within the TPMS structure;
    wherein a wall thickness of the walls of the TPMS structure or a unit cell size of the TPMS structure varies within the suppression core;
    wherein an annular cylinder is adjacent to the center bore, wherein the TPMS structure surrounds the annular cylinder; and
    wherein a plurality of first openings in the annular cylinder and a plurality of second openings in the TPMS structure surrounding the annular cylinder have a parameter that matches in size with each other, and the plurality of first openings and the plurality of second openings are approximately aligned with each other.

12. The suppressor of claim 11, wherein the wall thickness of the TPMS structure varies in a longitudinal direction.

13. The suppressor of claim 11, wherein the wall thickness of the TPMS structure varies in a radial direction.

14. The suppressor of claim 11, wherein the unit cell size of the TPMS structure varies in a longitudinal direction.

15. The suppressor of claim 11, wherein the unit cell size of the TPMS structure varies in a radial direction.

16. The suppressor of claim 11, wherein the wall thickness or the unit cell size varies in a portion of the suppression core.

17. The suppressor of claim 11, wherein the walls form channels within the TPMS structure, the channels providing flow pathways connected to the center bore.

18. The suppressor of claim 11, wherein the suppression core is made of a material, and wherein different materials are used in different parts of the suppression core.

19. The suppressor of claim 11, wherein the annular cylinder comprises an array of structures having rectangular cross-sections in a longitudinal direction.

* * * * *